United States Patent [19]

Poetsch

[11] 4,047,202

[45] Sept. 6, 1977

[54] AUTOMATIC COLOR BALANCING SYSTEM

[75] Inventor: Dieter Poetsch, Ober Ramstadt, Germany

[73] Assignee: Robert Bosch G.m.b.H., Stuttgart, Germany

[21] Appl. No.: 620,409

[22] Filed: Oct. 7, 1975

[30] Foreign Application Priority Data

Oct. 11, 1974 Germany .............................. 2448505

[51] Int. Cl.² .......................................... H04N 9/535
[52] U.S. Cl. ..................................................... 358/29
[58] Field of Search ................................... 358/29, 28

[56] References Cited

U.S. PATENT DOCUMENTS

| 3,637,920 | 1/1972 | Becker et al. | 358/29 X |
| 3,735,026 | 5/1973 | Smith et al. | 358/29 |
| 3,737,561 | 6/1973 | Boer | 358/28 X |
| 3,821,789 | 6/1974 | Durbin, Jr. et al. | 358/29 X |

FOREIGN PATENT DOCUMENTS 2,007,909   9/1970   Germany .............................. 358/29

Primary Examiner—John C. Martin
Assistant Examiner—Mitchell Saffian
Attorney, Agent, or Firm—Littlepage, Quaintance, Murphy, Richardson & Webner

[57] ABSTRACT

A system for regulating the color balance of a television signal by storing hue values only during periods when a predetermined luminosity gradient is present in the picture while, simultaneously, the picture remains below a predetermined color saturation threshold, and by using the stored hue value during subsequent periods to derive a regulating signal for controlling a color corrector.

17 Claims, 4 Drawing Figures

AUTOMATIC COLOR BALANCING SYSTEM

BACKGROUND OF THE INVENTION

1. Field of the Invention

The invention relates to a system for the automatic correction of the color balance of signals that determine the color and luminosity of a color television picture.

2. Description of the Prior Art

From the German Offenlegungsschrift No. 2,237,784 it is known to modify the chromaticity of a color television picture by means of a color corrector. The known color corrector comprises operating elements by means of which the chromaticity is manually adjustable within certain luminosity ranges of the color television picture according to the subjective perception of an observer.

Furthermore, from the German Offenlegunsschrift No. 2,141,685 it is known to carry out automatically color corrections of a color movie film in a pre-programmed manner. Such a pre-programmed color correction requires that sufficient time be available for a test run of the color movie. During the test run the color defects subjectively determined by an observer are stored scene upon scene. During the broadcast, the individual scenes are corrected in correspondence to the stored color defect values. In the case of certain color television broadcasts, e.g., news broadcasts with actual interpolations from other broadcasting stations, the prerun necessary for the preprogramming of a color correction is not possible. Such actual interpolations are broadcast without having been watched previously. Since furthermore the scenes of news broadcasts change very frequently, the video engineer finds it impossible to eliminate observed color defects while the individual scenes are being presented on the screen.

To overcome this disadvantage, an automatic color correction system has already been proposed wherein the color balance of the red and blue primary signals of a color signal source relative to the green primary signal of said source is automatically established. The balancing process takes place in this system when the amplitudes of the luminance signals drop below 7% or rise above 95% of the maximum luminance signal value, i.e., when they correspond to the black or white values of the luminance signal. This balance criterion is based on the assumption that the voltage level of the color signal becomes zero in black picture portions. The presence of a color signal in black or white picture portions, on the other hand, shows that a discoloration exists, and therefore no color balance between the primary signals exists. Such a system, however, presents undesired effects upon blue and skin-colored picture portions since a dark blue or a bright yellow likewise appears as black or white, respectively. Although no discoloration exists in the color television picture, the aforementioned balance criterion alone would lead to further color defects. For this reason, it has further been proposed to cut out the balancing process in dark blue and bright yellow hues. The hue recognizing circuits necessary for this purpose, however, are very expensive. Moreover, the balancing range, already narrowed down to less than 7% ang greater than 95% of the luminance signal, is even further narrowed down by this device. Besides, it becomes obvious that a satisfactory color rendition also requires a correction of the gray values (gamma correction). To carry out this correction automatically has hitherto been impossible since sufficient criteria were lacking.

SUMMARY OF THE INVENTION

The present invention provides a system of the initially mentioned kind by means of which in all luminosity ranges of the luminance signal color defects are reliably recognized and discolorations are eliminated.

This is accomplished as follows:

When a predetermined luminosity gradation is observed as being present in the color television picture, and when simulataneously the picture remains below a predetermined color saturation threshold, a hue of the color television picture that prevails at this moment is stored, so that regulating signals are derived as a function of the stored hue. These regulating signals adjust a circuit known per se for the color correction, thereby lessening a defect in the color balance of the signals that determine the color and luminosity of a color television picture.

The system of the invention is essentially based upon the following facts:

1. A discoloration has usually no great color saturation.
2. A discoloration is uniformly distributed over the entire picture.
3. A discoloration must be independent of the color saturation amplitudes prevailing at each instant. A typical example may clarify this factual situation: Assuming that the blue background illuminates a scene with a certain luminosity. A color television camera shooting this scene produces according to this scene primary signals R, G and B with a specific luminance signal Y. When then the luminosity of the background is increased, the amplitudes of the primary signals R, G and B increase at the same ratio and thus also the luminance signal Y although the blue background has not changed in color. A system for correcting the color balance should therefore only determine discolorations of the body colors.

The fact mentioned as item (1) requires according to the invention that picture portions with a color saturation of, for example, 20% be excluded from the correction of the color balance. The color saturation detector of the invention whose color saturation threshold is adjusted, for example, to 20%, recognizes color saturations of more than 20%. A following color saturation limiter has a limiting threshold of, for example, 10%.

The fact mentioned above as item (2) is according to the invention covered by an integration of color details with a color saturation of less than, for example, 20%. The integration takes place over the entire picture, that is to say a dominant color. For example, a red rose in the foregound of a scene cannot falsify the correction of the color balance.

The requirement mentioned as item (3) is according to the invention fulfilled by a standardization of the color signal, analyzed in a color difference signal coordinate system, as a function of the prevailing liminance signal. For this purpose the color difference signals are divided by the luminance signal by means of a division circuit.

The system of the invention presents the advantage that now color balance corrections can be carried out, not only during the run of black and white picture portions but also while gray picture portions are passing along (gamma correction).

BRIEF DESCRIPTION OF THE DRAWINGS

For expanation in greater detail, an embodiment of the system of the invention is described with the aid of the following FIGURES.

DESCRIPTION OF THE PREFERRED EMBODIMENTS

Figure 1:
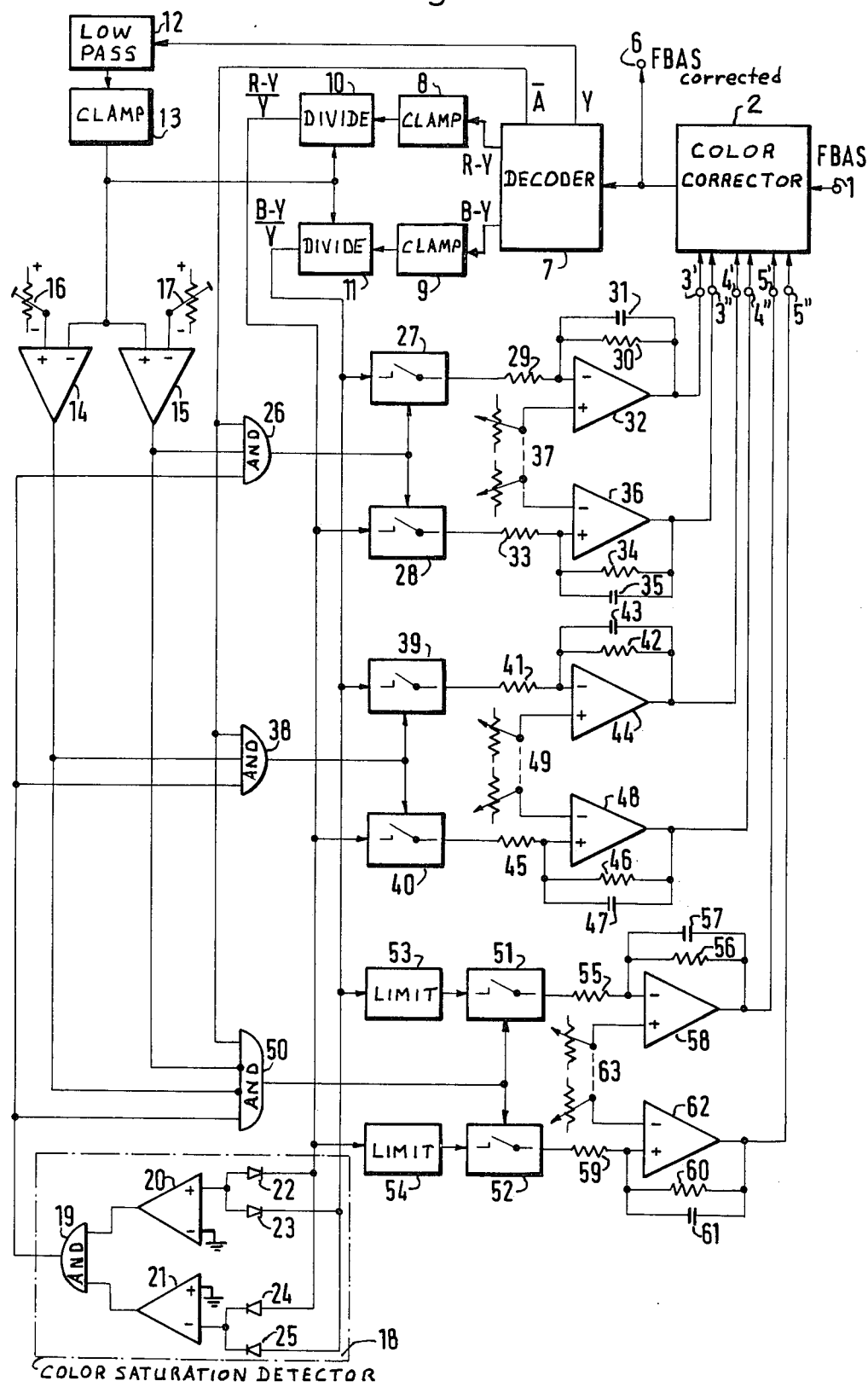
FIG. 1 illustrates a circuit of the system of the invention.

In the circuit shown in FIG. 1, an FBAS signal (a composite color video signal) to be corrected with respect to hue is fed via a terminal 1 to a color corrector 2 known per se. Such a color corrector is known from the German Offenlegungsschrift No. 2,237,784. By means of this color corrector, the chromaticity is modified by adding as boosting voltage a voltage of the frequency of a chrominance subcarrier with selectable amplitude and phase to the quadrature modulated chrominance subcarrier of the FBAS signal to be corrected. The added voltage of chrominance-subcarrier frequency is adjustable by means of the regulating signals present at adjusting inputs 3', 3", 4', 4", 5', 5". The regulating signals present at the adjusting inputs 3' and 3" serve to affect the chromaticity in white picture portions. The regulating signals present at adjusting inputs 4' and 4" are operative in black picture portions only. On the other hand, by means of the regulating signals present at adjusting inputs 5' and 5", only the medium luminosity levels of a color picture to be corrected can be modified. At the output of color corrector 2, a corrected FBAS signal can be tapped by means of a terminal 6. The corrected FBAS signal is fed to the input of a decoder 7. The function of decoder 7 consists in the decoding of the video signal (FBAS signal) of chrominance-subcarrier frequency into the two color difference signals (R-Y) and (B-Y), as well as into the luminance signal (Y) and a blanking signal A. The two color difference signals are first clamped in clamping stages 8 and 9 respectively and fed to the dividend input of division circuits 10 and 11 respectively. At the divisor inputs of the division circut 10 and 11 respectively, the luminance signal Y limited in frequency by a low-pass filter 12 and clamped by a clamping stage 13 is present. Division circuits 10 and 11 serve to standardize the color difference signals. The standardized color difference signal (R-Y)/(Y) can be tapped at the output of division circuit 10, and the standardized color difference signal (B-Y)/(Y) can be tapped at the output of division circuit 11. It is thus seen that each standardized color signal such as (B-Y)/(Y) has been normalized to extend from a value of $-1$ for $B = 0$ to a value of 0 for $B = Y$. Division circuits are knwon per se and may consist of a multiplier stage with inversion-operation amplifiers. A standardization of the two color difference signals presents the advantage that the points where following circuits (limiter and color saturation threshold detector) must be connected are unambiguously defined.

By means of two comparators 14 and 15, various liminosity gradations in the color television picture are determined. For this purpose the clamped luminance signal, proportional to the luminosity stages and limited in frequency, is fed to an inverse input of comparator 14 and to a non-inverse input of comparator 15. The other input of comparator 14 and the other input of comparator 15 are connected via trimmer potentiometers 16 and 17 to a prespecified d.c. voltage by means of which the threshold of the comparators can be adjusted. In the system of the invention, comparator 14 is adjusted by means of trimmer potentiometer 16 in such a way that at the output of comparator 14 a characteristic signal can always be tapped when the luminance signal is in the range from 0 to about 20% of the maximum luminance signal. Correspondingly, comparator 15 is adjusted by means of trimmer potentiometer 17 in such a way that at the output of comparator 15 a characteristic signal can be tapped when the luminance signal is in the range from about 75 to 100%. By means of comparator 14 therefore dark luminosity gradations, and by means of comparator 15 bright luminosity gradations are determined. By inversion and logical connection to an AND gate, a further characteristic signal can be derived which indicates the gray luminosity gradations of the luminance signal between 20 and 75% of the maximum luminance signal.

The two standardized color difference signals (R-Y)/(Y) and (B-Y)/(Y) are fed to a color saturation threshold detector 18. Color saturation detector 18 contains an AND gate 19 with two inputs which are connected each to an output of a comparator 20 and 21. The inverse input of comparator 20 and the non-inverse input of comparator 21 are connected to a reference potential. The non-inverse input of comparator 20 is connected via a diode 22 to the standardized color difference signal (R-Y)/(Y) and is also connected via a diode 23 to the standardized color difference signal (B-Y)/(Y). Correspondingly, the standardized color difference signal (R-Y)/(Y) is fed via a diode 24, and the standardized color difference signal (B-Y)/(Y) is fed via a diode 25, to the inverse input of comparator 21. Diodes 22 and 23, as well as diodes 24 and 25, are OR gate circuits.

Figure 2:
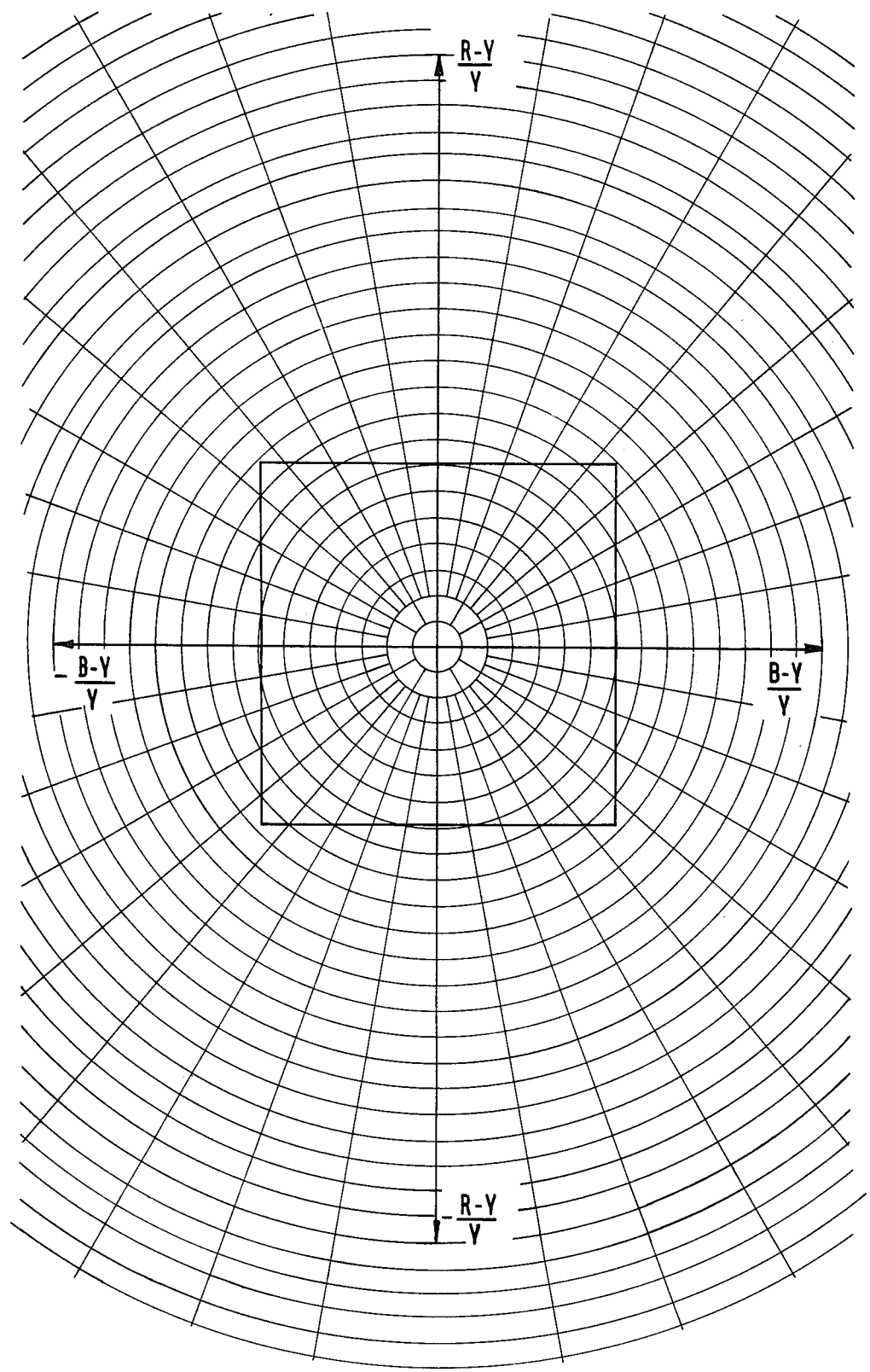
FIG. 2 illustrates a coordinate system of two standardized color difference signals with the color saturation range covered by the color saturation threshold detector.

The coordinate system shown in FIG. 2 illustrates the effect of the color saturation threshold detector 18. The standardized color difference signal (R-Y)/(Y) is recorded on the ordinate of the coordinate system and the standardized color difference signal (B-Y)/(Y) is recorded on the abscissa. The chromaticity is represented in such a coordinate system in polar coordinates. In such polar coordinates the length of a vector indicates the color saturation, and the direction of the vector indicates the hue. Only the colors saturated to a small degree are near the zero point, and the fully saturated colors are on the periphery of the polar coordinates. The square shown in FIG. 2 symmetrically to the center of the coordinate system indicates the color saturation limits at which the color saturation threshold detector becomes effective. One side of the square is assigned to each diode. The distance of the color saturation limits from the zero point of the coordinate system is determined by the voltage thresholds of the individual diodes. At the output of the AND gate 19 a signal with a high voltage level can be tapped when the color saturation in the color picture is inside the drawn square. It is not always practical to obtain quadratically arranged color saturation limits which are also located symmetrically from the zero point of the coordinate system. It has been found that a deformation of the square into a rectangle and a displacement of the rectangle toward a specific hue makes the system of the invention even more effective.

The signals thus previously produced are then logically connected. The inverse blanking signal A, the characteristic pulse signal at the output of comparator 15, and the characteristic pulse signal at the output of the color saturation threshold detector 18 are fed to the inputs of an AND gate 26. At the output of AND gate 26, a switching signal can be tapped which closes the contact paths of two electronic switches 27 and 28 when the FBAS signal is not blanked, when bright picture portions are recognized in the color picture and when the color picture remains below the color saturation, determined by the color saturation threshold detector 28, of the picture portion concerned. When the contact path of electronic switch 27 is closed, the standardized color difference signal (B-Y)/CY) is connected to the input of an integration circuit known per se with resistors 29 and 30, a capacitor 31 and a difference amplifier 32. The standardized color difference signal (R-Y)/(Y) is fed to the input of another integration circuit with resistors 33 and 34 as well as a capacitor 35 and a difference amplifier 36, via the closed contact path of electronic switch 28. The time constants of the integration circuit are dimensioned for the duration of, for example, two to three half pictures. At the output of integration circuit 29 to 32 a first regulating signal, and at the output of integration circuit 33 to 36, a second regulating signal can be tapped. The two regulating signals are fed to adjusting inputs 3' and 3" of color corrector 2, which is known per se, and they bring about the result that in bright picture portions discolorations present in the color picture are removed by regulation. A control device 37, which is connected to difference amplifiers 32 and 36, serves to set the reference input between the two regulating signals. Control device 37 consists, for exmple, of two potentiometers to whose wiper contact paths various potentials are applied and whose wiper contacts are mechanically coupled with a control stick. A color spectrum according to FIG. 2 is to be reproduced by such a structure.

The following circuit for dark picture areas is constructed in a manner similar to that of the device described for the derivation of regulating signals in bright picture areas. The inverse blanking signal A, the characteristic pulse signal tapped at the output of color saturation threshold detector 18, and the characteristic pulse signal tapped at the output of comparator 14 are fed to the three inputs of an AND gate 38. The switch signal present at the output of AND gate 38 serves to control the contact paths of electronic switches 39 and 40. When the contact path of electronic switch 39 is closed, the standardized color difference signal (B-Y)/(Y) is fed to an integration circuit 41 to 44, and when the contact path of electronic switch 40 is closed, the standardized color difference signal (R-Y)/(Y) is fed to an integration circuit 45 to 48. The output of integration circuit 41 to 44 is connected to adjusting input 4', and the output of integration stage 45 to 48 is connected to adjusting input 4". The regulating signals fed to adjusting inputs 4' and 4" permit a color correction of the FBAS signal in the dark picture portions of a color picture. By means of a control device 49 connected to difference amplifiers 44 and 48, the reference input of the two regulating signals is set. The structure of control device 49 corresponds to that of control device 37. The time constant of the integration circuits for, for example, two to three, half pictures is likewise set.

An AND gate 50 is provided in order to derive a switch signal for the contact paths of electronic switches 51 and 52. The inverse blanking signal A and the characterisitic pulse signal tapped at the output of color saturation threshold detector 18 are fed in a noninverse manner to the inputs of AND gate 50, and the characteristic pulse signals produced by comparators 14 and 15 are fed to the inverse inputs of AND gate 50. The switch signal controlling the contact paths of electronic switches 51 and 52 closes the contact paths when no blanking in the FBAS signal exists and the color saturation remains below the prespecified color saturation threshold, and when medium luminosities in the color television picture are recognized. In contrast to the derivation described above of the regulating signals for the adjusting inputs 3', 3", 4' and 4" of color corrector 2, in this embodiment the standardized color difference signals, are subjected to an amplitude limitation before being fed to the integration stages. Limiters may also be installed in the white and black paths. The standardized color difference signal (B-Y)/(Y) is limited by limiter 53, and the standardized color difference signal (R-Y)/(Y) is limited by a limiter 54. The limiting thresholds of limiters 53 and 54 are below the color saturation thresholds of color saturation threshold detector 18. Limiters 53 and 54 limit the standardized color difference signals in the present embodiment to 10% of the total amplitude of the standardized color difference signals. By the limitation of the standardized color difference signals, fully saturated colors are reduced to a lower color saturation. The limitation became necessary because small but fully saturated picture details may lead to defects in the color correction. The signals tapped at the output of electronic switch 51 are integrated by means of an integration circuit 55 to 58, and the signals tapped at the output of electronic switch 52 are integrated by means of an integration circuit 59 to 62 via two to three half pictures, and both signals are fed as regulating signals to the adjusting inputs 5' and 5" of color corrector 2. The reference input of the two regulating signals can be set by means of a control device 63.

In experiments it was found that a regulation operating in the medium luminosity stages of a color television picture produces the best color correction impression. Furthermore, it was found that, due to the employment of the color saturation threshold detector of the invention, the adjustment of comparators 14 and 15 is not critical since the operation takes place in relative independence of the white and black thresholds. In connection therewith, a further advantage is that the thresholds of comparators 14 and 15 need to be firmly set only once.

The system of the invention is not limited to the embodiment of the circuit shown in FIG. 1. Other modifications for automatic correction of the color balance of signals that determine color and luminosity of a color television picture are likewise possible. Thus, for example, a decoder may be dispensed with when a color signal source produces only the primary signals R, G and B. By matricizing the three primary signals R, G and B to convert to color difference signals R-Y, G-Y, and B-Y as well as to luminance signal Y, and by subsequent division, three standardized color difference signals are obtained. These three standardized color difference signals are then fed to an extended color saturation threshold detector.

Figure 3:
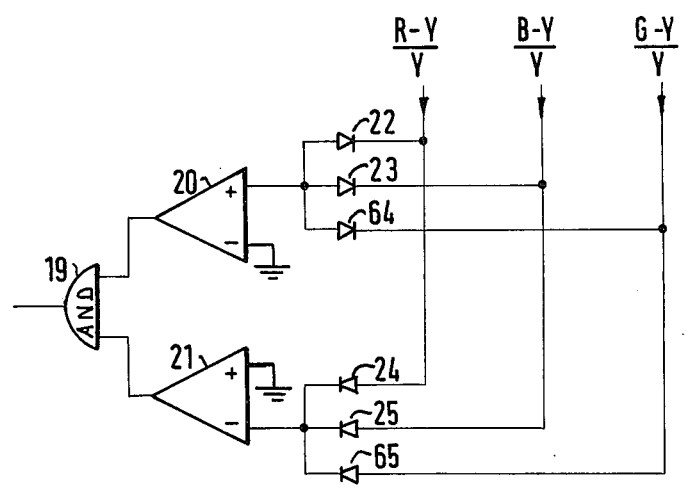
FIG. 3 illustrates a circuit of a color saturation threshold detector for three color difference signals.

FIG. 3 shows the circuit of such an extended color saturation threshold detector for three standardized color difference signals. This color saturation threshold detector differs from the color saturation threshold detector of FIG. 1 in that two further diodes 64 and 65 are provided in the OR gate circuit for the standardized color difference signal (G-Y)/(Y). The reference symbols of the other structural elements of the color saturation threshold detector of FIG. 3 agree with those of the color saturation threshold detector 18 shown in FIG. 1.

Figure 4:
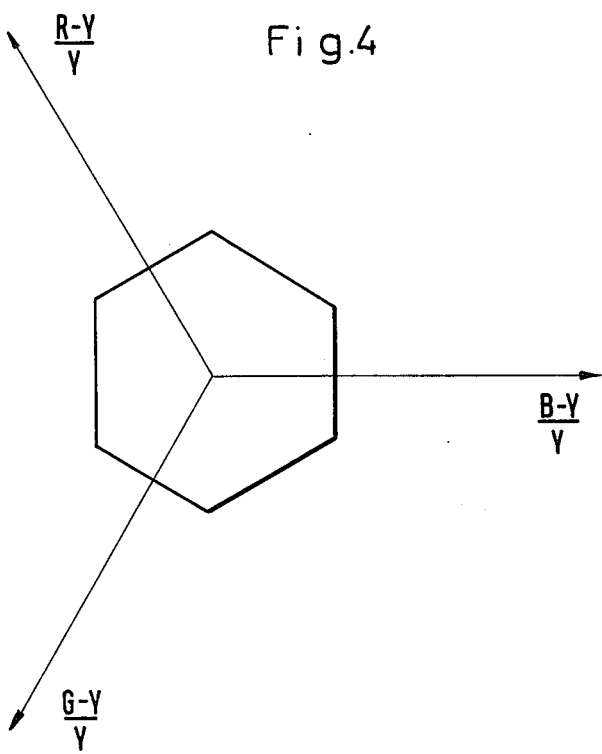
FIG. 4 illustrates a coordinate system with the color saturation range covered by the circuit according to FIG. 3.

FIG. 4 shows the effective range of the circuit of FIG. 3 by means of a coordinate system. In this coordinate system, the three standardized color difference signals are shown as coordinates. In this coordinate system, too, the colors of little saturation are close to the zero point. Toward the periphery of the coordinate system, the saturation of the colors increases. The hexagon positioned symmetrically about the coordinate zero point indicates the color saturation area which is covered by a circuit according to FIG. 3. The color saturation threshold detector of FIG. 3 always emits an indicating signal when the color saturation of a picture portion is located within the area of the hexagon.

The further signal treatment in the modification with three standardized color difference signals is equivalent to that of FIG. 1. However, it is now possilbe to control directly the color balance of the three primary signals of a color signal source by means of the regulating voltages.

The system of the invention can also be broadened by a storing device which follows the integration circuits and wherein the signal values of these integration circuits are fed to vertical picture blanking gaps. The selected time constant of the integration circuits is then smaller than one half picture. The regulating signals are stored by means of a device for time-selective scanning and storing via the picture area. A system thus broadened can follow abrupt changes of color more rapidly.

What is claimed is:

1. A system for automatic correction of at least two color difference signals which determine the color and luminosity of a color television signal comprising:
   A. first means responsive to said signal for providing a first indication when a predetermined luminosity gradation is present in a picture represented by said signal,
   B. second means responsive to the color difference signals for providing a second indication when said at least two color difference signals remain within respective predetermined color saturation thresholds,
   C. storage means responsive to the simultaneous presence of the first and second indications for storing values indicative of the chromaticity of said picture prevailing at that moment,
   D. deriving means for deriving a regulating signal as a function of the stored value of the chromaticity, and
   E. adjusting means responsive to the regulating signal for correcting defects in the color balance of the signals that determine color and luminosity of the color television picture,
   whereby defects in the color and luminosity of the picture are lessened.

2. A system for automatic correction of color balance signals which determine the color and luminosity of a color television signal comprising:
   A. first means responsive to said signal for providing a first indication when a predetermined luminosity gradation is present in a picture represented by said signal,
   B. second means responsive to said signal for providing a second indication when said picture remains below a predetermined color saturation threshold,
   C. storage means responsive to the simultaneous presence of the first and second indications for storing values indicative of the chromaticity of said picture prevailing at the moment,
   D. deriving means for deriving a regulating signal as a function of the stored value of the chromaticity, and
   E. adjusting means responsive to the regulating signal for correcting defects in the color balance of serveral color difference signals that determine the color and luminosity of the color television picture,
   whereby defects in the color and luminosity of the picture are lessened and
   wherein the determination of when the color saturations in the color television picture remain below the predetermined color saturation threshold takes place as a function of the signal amplitude of normalized color difference signals.

3. A system according to claim 2, wherein said several color difference signals that determine the color of the color television picture are color difference signals (R-Y) and (B-Y) which are derived, by means of a deconder, from a color video signal tapped at the output of a color corrector.

4. A system according to claim 2, wherein said several color difference signals that determine the color of the color television picture are color difference signals (R-Y), (B-Y) and (G-Y) which are derived, by means of a matrix, from primary signals R, G and B of a color signal source.

5. A system for automatic correction of color balance signals which determine the color and luminosity of a color television signal comprising:
   A. first means responsive to said signal for providing a first indication when a predetermined luminosity gradation is present in a picture represented by said signal,
   B. second means responsive to said signal for providing a second indication when said picture remains below a predetermined color saturation threshold,
   C. storage means responsive to the simultaneous presence of the first and second indications for storing values indicative of the chromaticity of said picture prevailing at that moment,
   D. deriving means for deriving a regulating signal as a function of the stored value of the chromaticity, and
   E. adjusting means responsive to the regulating signal for correcting defects in the color balance of the signals that determine color and luminosity of the color television picture,
   F. whereby defects in the color and luminosity of the picture are lessened, wherein the signals that determine the color of the television picture are several (n in number) color-difference signals, and further comprising, for the normalization of n color-difference signals (R-Y or B-Y or G-Y, respectively), G. n division circuits, each with a dividend and a divisor input and each with a quotient output, H. means for feeding a color-difference signal to each of the dividend inputs, I. means for feeding a luminance signal (Y) to each of the divisor inputs, and J. means, at the quotient output, for tapping a color difference signal (R-Y)/(Y) or (B-Y)/(Y) or (G-Y)/(Y) normalized according to the color-difference signal.

6. A system according to claim 5, further comprising means for clamping signals to the same potential before these signals are fed to the inputs of the division circuits.

7. A system according to claim 5 wherein the second means comprises a color saturation threshold detector, and wherein, for the purpose of determining whether the picture passes above or remains below the prespecified color saturation threshold, the color difference signals are fed to the color saturation threshold detector to produce a signal with a first voltage level when the color saturation of the color television picture exhibits a saturation above the predetermined color saturation threshold, and to produce a signal with a second voltage level as said second indication when the picture exhibits a saturation remaining below the predetermined color saturation threshold.

8. A system according to claim 7 wherein the color satuartion threshold detector comprises an AND gate having two inputs connected to the output of first and second comparators, wherein to an inverse input of the first comparator and to a non-inverse input of a second comparator a reference potential is applied, and wherein furthermore the normalized color difference signals are fed to the non-inverse input of the first comparator via a first OR gate and to the inverse input of the second comparator via a second OR gate, and finally wherein at the output of the first AND gate a signal with said second voltage level can be tapped when the color saturation of the color television picture remains below the predetermined color saturation threshold.

9. A system according to claim 8, further comprising integration circuits, to the inputs of which color difference signals or are fed via electronic switches and from the outputs of which the regulating signals are tapped.

10. A system according to claim 9, further comprising means for manually adjusting the balance of the regulating signals produced in the television picture according to the prespecified luminosity gradation and color saturation by means of a control device.

11. A system according to claim 10, wherein the time constant of each integration circuit is greater than a half picture.

12. A system according to claim 10, wherein the time constant of each integration circuit is smaller than a half picture, and wherein the integrated signal values are stored during a picture blanking period by means of a storing device and are kept constant during the following picture interval.

13. A system according to claim 9, wherein normalized color difference signals of limited amplitude are fed to the integration circuits by way of contact paths of electronic switches.

14. A system according to claim 13, wherein contact paths of a first group of electronic switches are closed only when a white picture detail is found in the color television picture by means of a first comparator circuit, and furthermore, when the color saturation threshold recognizes in the color television picture a color saturation below the predetermined color saturation, and when no blanking interval of the color television signal is present.

15. A system according to claim 13, wherein contact paths of a second group of electronic switches are closed only when a black picture detail is found in the color television picture by means of a second comparator circuit, and when the color saturation threshold detector recognizes in the color television picture a color saturation below the predetermined color saturation threshold, and when no blanking interval of the color television signal exists.

16. A system according to claim 13, wherein contact paths of a third group of electronic switches are closed only when neither a white nor a black picture detail is observed in the color television picture by means of the first and second comparator circuit, and when the color saturation threshold detector recognizes in the color television picture a color saturation remaining below the predetermined color saturation threshold, and when no blanking interval of the color television signal exists.

17. A system according to claim 13, wherein normalized color difference signals of limited amplitude are fed to the integration circuits via the contact paths of a third group of electronic switches only when neither a white nor a black picture detail is found in the color television picture by means of the first and second comparator circuit and when, in addition, no blanking interval of the color video signal exists.

* * * * *